F. W. WALRAVEN.
AUTOMATIC DRAIN VALVE FOR STEAM CYLINDERS.
APPLICATION FILED SEPT. 13, 1911.
1,020,861.
Patented Mar. 19, 1912.
2 SHEETS—SHEET 2.
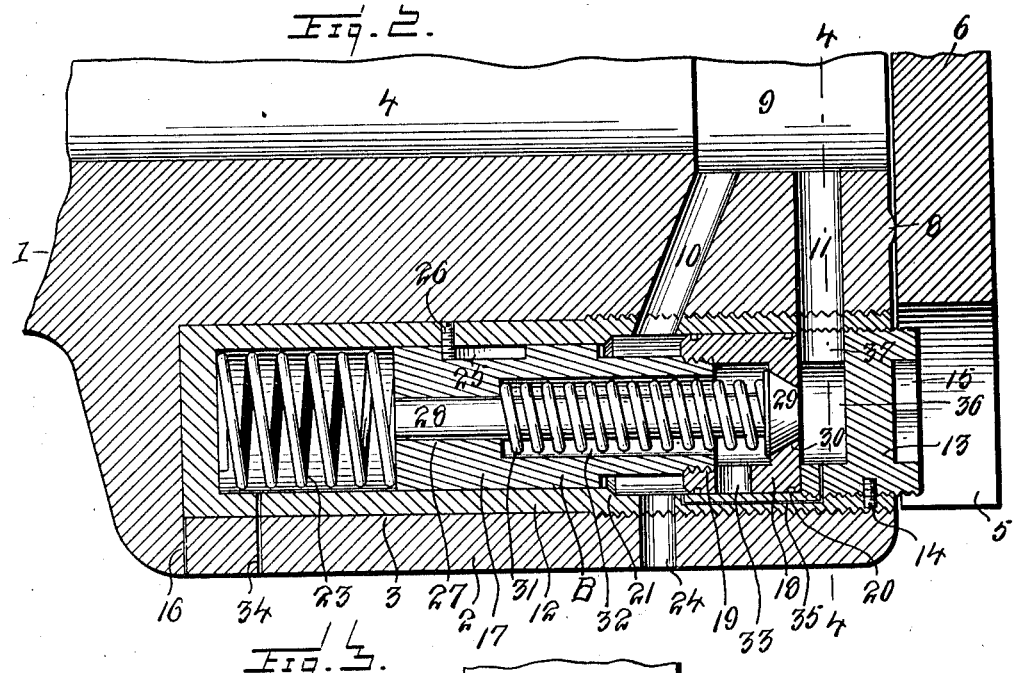
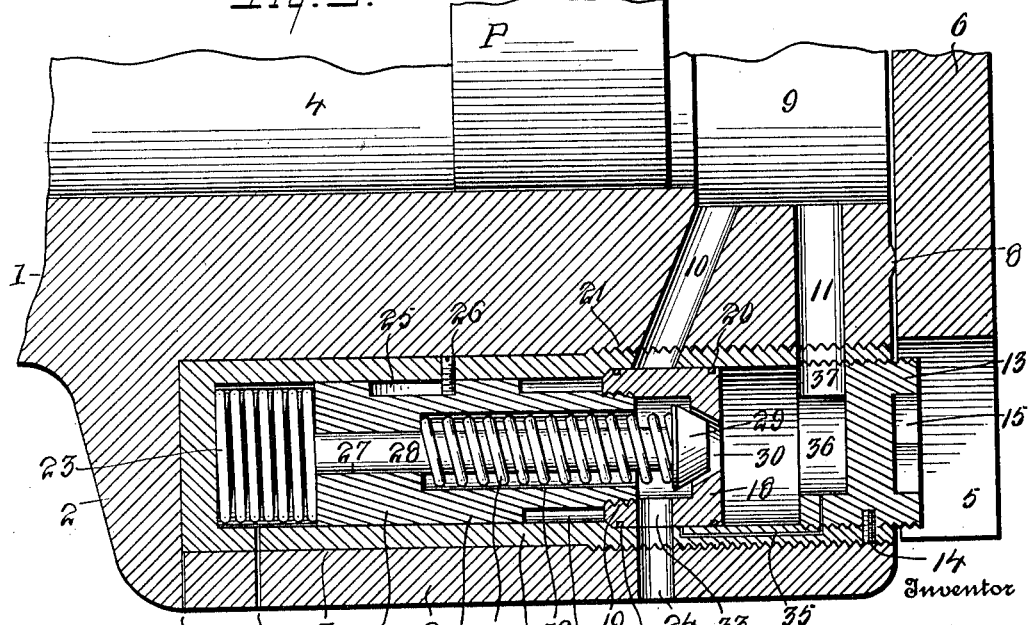
Witnesses
E. R. Ruppert.
Wm. Bagger.
Inventor
Francis W. Walraven
By Victor J. Evans
Attorney

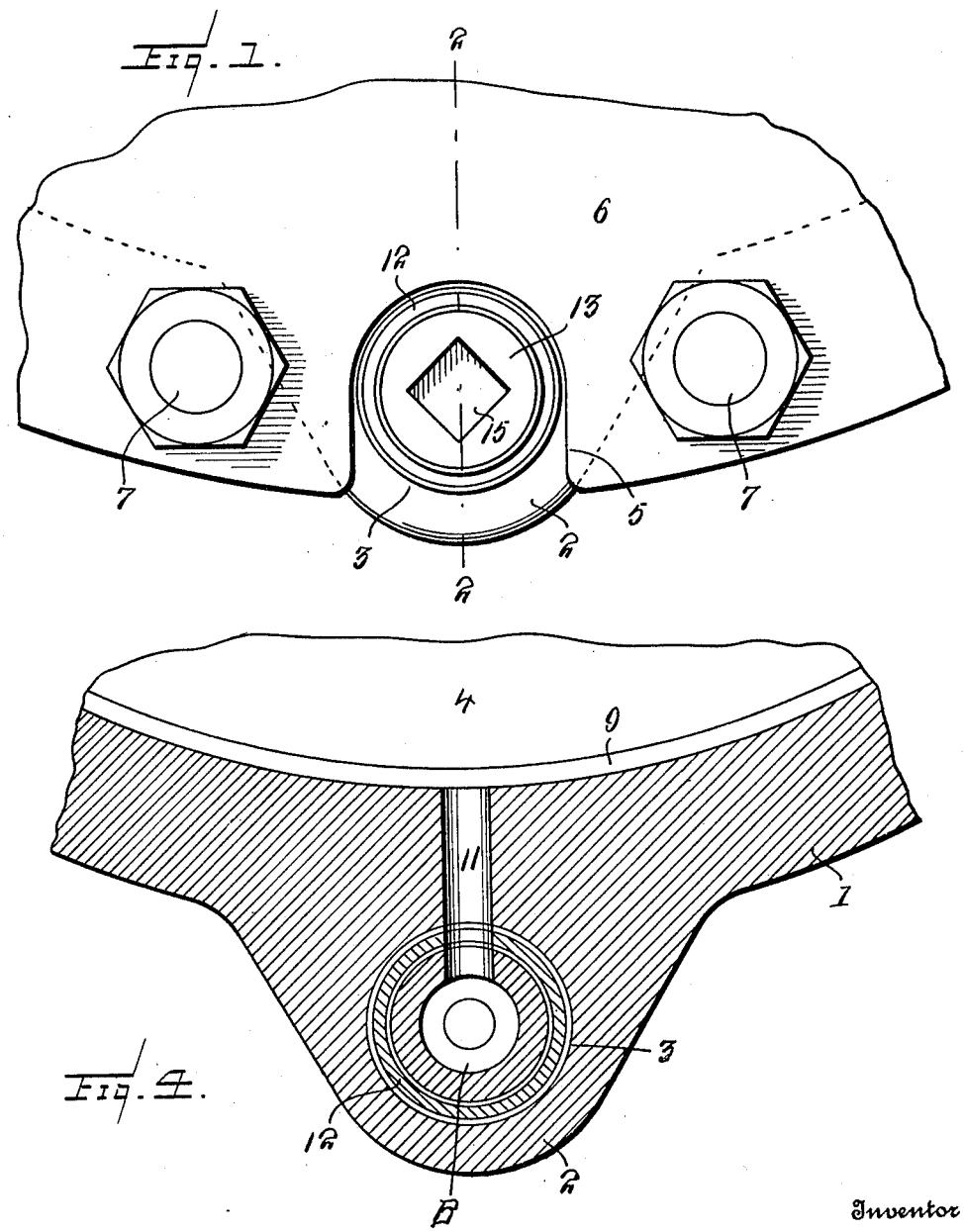

UNITED STATES PATENT OFFICE.

FRANCIS W. WALRAVEN, OF LAS CASCADAS, CANAL ZONE.

AUTOMATIC DRAIN-VALVE FOR STEAM-CYLINDERS.

1,020,861. Specification of Letters Patent. Patented Mar. 19, 1912.

Application filed September 13, 1911. Serial No. 649,083.

*To all whom it may concern:*

Be it known that I, FRANCIS W. WALRAVEN, a citizen of the United States, residing at Las Cascadas, Canal Zone, Panama, have invented new and useful Improvements in Automatic Drain-Valves for Steam-Cylinders, of which the following is a specification.

This invention relates to drain valves for the cylinders of locomotives and other engines, and the principal object of the invention is to produce a valve of simple construction which shall operate automatically to relieve the cylinder from any accumulation of water of condensation, thus taking the place of the manually operable valve which is now customarily employed for this purpose.

A further object of the invention is to provide a construction under which a normally open outlet is provided for water of condensation together with a valve mechanism operable by steam pressure within the cylinder to obstruct such normally open outlet and to provide a separate or auxiliary outlet or emergency outlet.

With these and other ends in view which will readily appear as the nature of the invention is better understood, the same consists in the improved construction and novel arrangements of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a front elevation showing a portion of a cylinder equipped with the invention. Fig. 2 is a longitudinal sectional view taken on the line 2—2 in Fig. 1. Fig. 3 is a longitudinal sectional view similar to Fig. 2, but showing the valve in a different position. Fig. 4 is a transverse sectional view taken on the line 4—4 in Fig. 2.

Corresponding parts in the several figures are denoted by like characters of reference.

1 represents a portion of the body of a steam cylinder of which only one end is shown, it being understood that the other end is to be constructed and equipped in accordance with the following description.

The cylinder body is provided upon its underside, adjacent to the end thereof, with a boss or enlargement 2 having a longitudinal bore 3 which is parallel to the bore 4 of the cylinder. The bore 3 is accessible through a notch 5 in the cylinder head 6 which is securely mounted in the usual manner by fastening means, such as bolts 7, packing 8 being employed to provide a steam-tight joint. The end of the bore proper of the cylinder has an enlargement or counterbore 9 which communicates with the bore 3 by an inclined passage 10 and a vertical passage 11, the latter being preferably of greater area than the passage 10 which is inclined inwardly or in the direction of the inner end of the bore 3.

The outer end of the bore 3 is threaded for the reception of a correspondingly threaded sleeve or housing 12 having at its outer end a plug 13 which is retained securely by a pin or screw 14, said plug being provided with a non-circular recess 15 for engagement with a wrench whereby it may be placed in position or detached, as the case may be. The sleeve or housing 12 should be very snugly fitted in the bore 3, and the inner end of the latter communicates with the exterior of the enlargement 2 through a vent opening 16 which permits the escape of air when the housing is placed in position.

Fitted in the sleeve or housing 12 where it is longitudinally movable is a cylindrical valve member B comprising a body portion 17 and a head portion 18 which latter is threaded upon the cylindrical body portion, as shown at 19. Said head portion is also provided with packing, as shown at 20, to insure a tight fit between said valve head and the bore of the sleeve or housing, which latter is provided intermediate the ends thereof with a seat 21 for the valve head 18. Said valve head is, as will be seen, of greater diameter than the body portion 17, and the bore of the sleeve or housing is correspondingly enlarged at its outer end. The body portion of the valve member B is provided adjacent to the head 18 with an annular groove or recess 22 which, when the valve member B is projected in an outward direction by the action of a spring 23 interposed between the inner end of the valve member and the inner wall of the housing will lie in registry with the inclined channel 10 and with a port or opening 24 extending through the wall of the housing 12 and through the boss or enlargement 2. The valve member B is provided with a longitudinal slot 25 engaged by a pin 26 that extends through the wall of the housing 12 for the purpose of preventing the valve member from turning about its axis without interfering with the longitudinal reciprocatory movement of said valve member.

The valve member B has a longitudinal bore 27 for the passage of a valve stem 28 carrying a head 29 which is adapted to obstruct an aperture 30 in the head member 18, said valve head 29 being actuated and normally held in a seated or obstructing position by means of a spring 31 which is coiled about the stem 28, said spring being accommodated in an enlargement or counterbore 32 of the bore 27. The spring 31 is to be of such tension that the valve 29 will be moved to a non-obstructing position by normal boiler pressure. The head 18 of the valve member B is in the nature of a cap, the side wall of which is provided with a port or aperture 33 which, when the valve member is retracted against the tension of the spring 23, will register with the outlet port 24, as clearly shown in Fig. 3 of the drawings. A vent 34 connects the inner end of the housing 12 with the atmosphere. A leak vent 35 is also provided which, when the valve member B, is in the projected position shown in Fig. 2, serves to establish communication between the counterbore of the cylinder through the passage 11 and the outlet port 24 through the annular groove 22 of the valve member B. It will be noted that the plug 13 which constitutes a closure for the outer end of the housing and which serves to obstruct the outward movement of the valve member B is provided with a recess 36 having an opening 37 registering with the passage 11, said recess communicating also with the leak vent 35.

In the operation of this device, when the piston, a portion of which has been indicated at P, reaches the limit of its movement in one direction, and live steam fills the counterbore between the piston and the proximate cylinder head, the pressure of the steam through the passage 11 which, as previously stated, is preferably of slightly larger area than the passage 10, will displace the valve B against the tension of the spring 23 to the position shown in Fig. 3, and at the same time the valve 29 will be moved to a non-obstructing position, causing water of condensation to be expelled through the passage 11, ports 30 and 33 and the outlet passage 24. As the piston recedes, and the pressure upon the valves 29 and B becomes less, the said valves will become seated by the action of their respective springs, and condense water may now escape through the inclined passage 10, the annular groove 22 and the outlet 24. When the engine is at rest, the cylinder will be drained through the passage 11, port 37, vent leak 35 and outlet 24.

By the construction and arrangement of the improved automatic drain valve herein described several important advantages are gained. The drain cocks which are now in common use are particularly objectionable upon locomotive engines used in construction work, because they project just far enough to be in the way of obstructions of any kind, whereby such drain valves are liable to be broken off, thereby involving considerable expense or loss of time and necessary repairs.

By the present improvement the drain valve is housed within a solid integral projection of the cylinder which barely projects beyond the margin of the cylinder head and which, even if obstruction should be encountered, has sufficient strength and solidity to resist any ordinary blow or, in fact, any blow short of an actual wreck. Again, drain valves that require to be manually operated by rods or cords leading to the cab are frequently neglected when the attention of the engineer is otherwise engaged, and condense water is apt to be blown through the exhaust carrying with it soot and particles of dirt which are scattered broadcast to the discomfort of bystanders.

By the improved construction and arrangement of parts herein shown and described a drain valve is provided which is entirely automatic in its operation and which under all circumstances will dispose of the water of condensation as fast as it accumulates.

Having thus described the invention, what is claimed as new, is:—

1. A steam cylinder having an integral enlargement provided with a longitudinal bore, a housing seated in the bore and having threaded connection therewith, said housing having a plug at its outer end, ducts connecting the interior of the housing with the bore of the cylinder, an outlet duct connecting the interior of the housing with the atmosphere, a spring actuated valve member slidable in the housing and having an annular recess, said valve member including a cap having an axial port and a radial port, the latter adapted to register with the outlet, a spring seated valve obstructing the axial port, and means for preventing the valve member from turning about its axis.

2. A steam cylinder having an enlargement or boss provided with a longitudinal bore, a housing seated in the bore and having at its outer end a plug provided with a wrench seat, means for securing said plug against rotation with reference to the housing, a cylinder head having a notch through which the plug is accessible, ducts connecting the interior of the housing with the bore of the cylinder and with the atmosphere, and spring seated valve means within the housing adapted to be actuated by the pressure of steam in the cylinder.

3. A steam cylinder having a boss or enlargement provided with a longitudinal bore, a vent connecting the inner end of said bore with the atmosphere, a tightly fitting housing seated in and having threaded connection with said bore, a plug threaded into the outer end of the housing and having a wrench seat, and a pin engaging the plug through the wall of the housing to secure the plug against rotation.

4. A steam cylinder having an integral boss or enlargement provided with a longitudinal bore, a housing tightly fitted in and securely connected with said bore, said housing having at its outer end a securely seated plug provided with a recess in its inner end, a vertical duct connecting said recess with the bore of the cylinder, an inclined duct connecting the interior of the housing with the bore of the cylinder, a port alining with the inner end of said inclined duct and connecting the interior of the housing with the atmosphere, a vent connecting the inner end of the bore of the housing with the atmosphere, a vent leading from the recess in the inner side of the plug and opening into the interior of the housing adjacent to the outlet port, a spring actuated valve member seated in the housing and including a cap having an axial port constituting a valve seat and a radial port adapted to register with the outlet, means for preventing the rotation of the valve member about its axis, and a spring actuated valve associated with the valve member and normally obstructing the axial port in the cap of said valve member, the latter being provided with an annular recess which when the valve member is projected establishes communication between the outlet and the inner end of the inclined duct.

In testimony whereof I affix my signature in presence of two witnesses.

FRANCIS W. WALRAVEN.

Witnesses:
WM. BAGGER,
BENNETT S. JONES.

Copies of this patent may be obtained for five cents each, by addressing the "Commissioner of Patents, Washington, D. C."